(12) United States Patent
Doglioni Major

(10) Patent No.: US 8,960,077 B2
(45) Date of Patent: Feb. 24, 2015

(54) DOUBLE PISTON APPARATUS FOR CONTROLLING THE PREPARATION OF BEVERAGES

(75) Inventor: Luca Doglioni Major, Carate Urio (IT)

(73) Assignee: Rheavendors Services S.p.A. (IT)

( * ) Notice: Subject to any disclaimer, the term of this patent is extended or adjusted under 35 U.S.C. 154(b) by 0 days.

(21) Appl. No.: 13/356,232

(22) Filed: Jan. 23, 2012

(65) Prior Publication Data

US 2013/0022716 A1    Jan. 24, 2013

Related U.S. Application Data

(62) Division of application No. 11/722,787, filed as application No. PCT/IB2005/003880 on Dec. 23, 2005, now Pat. No. 8,124,150.

(30) Foreign Application Priority Data

Dec. 30, 2004  (EP) .................................. 04031014

(51) Int. Cl.
| | | |
|---|---|---|
| A47J 31/36 | (2006.01) | |
| A47J 31/52 | (2006.01) | |
| A47J 31/44 | (2006.01) | |
| A47J 31/40 | (2006.01) | |
| A47J 31/42 | (2006.01) | |

(52) U.S. Cl.
CPC .............. *A47J 31/52* (2013.01); *A47J 31/3609* (2013.01); *A47J 31/4482* (2013.01); *A47J 31/405* (2013.01); *A47J 31/42* (2013.01)
USPC .......................................... 99/302 P; 99/283

(58) Field of Classification Search
USPC ......... 99/302 P, 289 R, 286, 302 R, 297, 287, 99/280, 283
See application file for complete search history.

(56) References Cited

U.S. PATENT DOCUMENTS

| | | | | |
|---|---|---|---|---|
| 3,760,712 | A | * | 9/1973 | Rossi ........................... 99/289 R |
| 3,918,355 | A | * | 11/1975 | Weber ............................. 99/283 |
| 4,484,515 | A | * | 11/1984 | Illy .................................. 99/282 |
| 4,583,449 | A | * | 4/1986 | Dangel et al. ................... 99/279 |
| 4,767,632 | A | | 8/1988 | Meier |
| 4,852,472 | A | * | 8/1989 | In-Albon et al. ............ 99/289 R |
| 4,882,982 | A | * | 11/1989 | Muttoni .......................... 99/295 |
| 5,127,318 | A | * | 7/1992 | Selby, III ........................ 99/295 |
| 5,255,594 | A | * | 10/1993 | Grossi ............................. 99/287 |

(Continued)

FOREIGN PATENT DOCUMENTS

| | | |
|---|---|---|
| EP | 0150693 A | 8/1985 |
| EP | 309780 A1 * | 4/1989 |

(Continued)

OTHER PUBLICATIONS http://candleandsoap.about.com/od/coldprocesssoapmaking/ht/htoilinfusion.htm, 2005.*

*Primary Examiner* — Henry Yuen
*Assistant Examiner* — John J Norton
(74) *Attorney, Agent, or Firm* — Hess Patent Law Firm LLC; Robert J. Hess

(57) ABSTRACT

A dispensing apparatus for hot beverages is provided with a device (4,5) to filter hot, pressurized water through ground edible ingredients such as coffee, tea or herbal remedies in a chamber, a controlling unit (16) storing data, and two pistons operated independently by two motors to control the volume and/or the position of the brewing chamber.

17 Claims, 6 Drawing Sheets

(56) References Cited

U.S. PATENT DOCUMENTS

| | | | |
|---|---|---|---|
| 5,638,740 A * | 6/1997 | Cai | 99/295 |
| 5,645,230 A * | 7/1997 | Marogna et al. | 241/27 |
| 5,931,080 A * | 8/1999 | Roure Boada | 99/293 |
| 6,047,630 A * | 4/2000 | Brown et al. | 99/279 |
| 6,129,006 A * | 10/2000 | Schmed | 99/302 P |
| 6,474,504 B1 | 11/2002 | Simmons et al. | |
| 6,701,826 B2 * | 3/2004 | Wu | 99/305 |
| 7,017,474 B2 * | 3/2006 | Comte | 99/302 P |
| 8,240,245 B2 * | 8/2012 | Doglioni Majer | 99/302 P |
| 8,820,217 B2 * | 9/2014 | Doglioni Majer | 99/302 P |

FOREIGN PATENT DOCUMENTS

| | | |
|---|---|---|
| EP | 0496940 | 8/1992 |
| EP | 1059055 | 2/2000 |
| EP | 1059055 A | 12/2000 |
| EP | 1059055 A1 * | 12/2000 |
| EP | 1306040 | 5/2003 |
| GB | 2397510 | 7/2004 |
| WO | 00/45685 A2 | 8/2000 |
| WO | 00/51479 A | 9/2000 |
| WO | 0051479 | 9/2000 |
| WO | 02091891 | 11/2002 |

\* cited by examiner

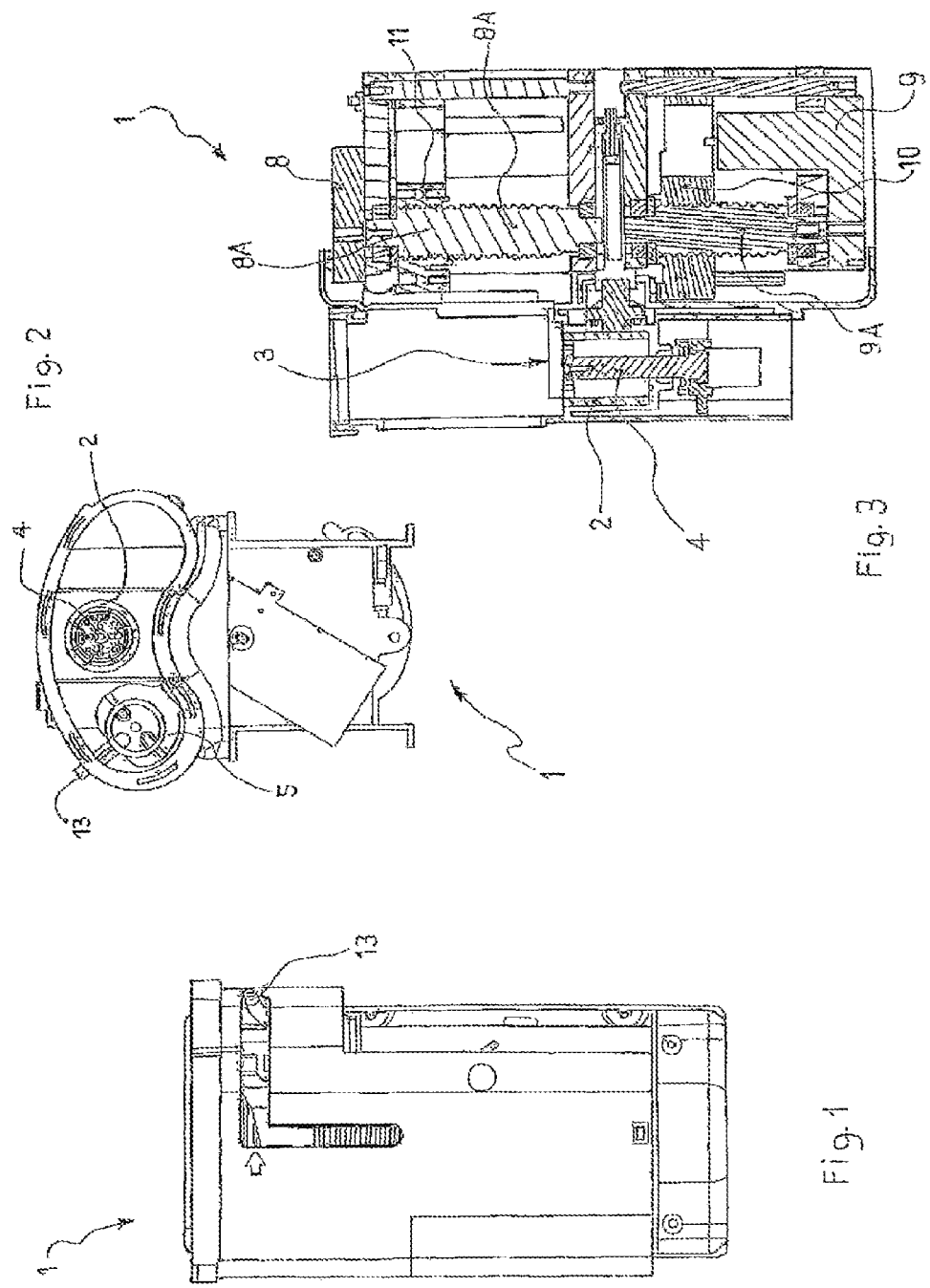

DOUBLE PISTON APPARATUS FOR CONTROLLING THE PREPARATION OF BEVERAGES

FIELD OF THE INVENTION

The present invention relates to a process and an double-piston apparatus for controlling the preparation of beverages. More particularly, the present invention concerns a brewing process and apparatus, including an electronic controller, conceived to control the process of making freshly-brewed hot beverages obtained by filtering with hot, pressurised water from ground or minced edible products such as tea, coffee, herbal remedies and the like.

BACKGROUND OF THE INVENTION

This invention is aimed for use in fully automatic hot beverage dispensing machines for homes, offices or so called food-service—or HoReCa—sites. The invention apparatus can also be used to dispense hot beverages from soluble products, i.e. the so-called instant drinks.

Fully automatic beverage dispensing machines, particularly the ones brewing hot drinks from ground fresh ingredients, are not yet recognised for an outstanding quality of their drinks. A manually prepared espresso by a skilled barman (barista) is still seen as a better beverage than one prepared by an automatic machine.

Steps to prepare a manual espresso have been described in several publications. These steps are: ensuring temperature of all components involved in the dispensing of the beverage is correct; weighing the amount of ground roasted coffee (e.g. 6,5 grams); coffee grinding adjusted to obtain the suitable particle size, making sure that the climatic conditions, especially relative humidity, do not change ideal grinding size, so as to have a correct brewing time (e.g. 25" for 40 cc.) is regularly achieved; compacting the coffee inside the brewing chamber, usually attached to a handle, with the aim to achieve the right brewing time via the correct drag through the coffee cake.

There are many patents directed to using the above concepts for improving coffee quality.

EP0554650 to Cavazzuti and Annibali teaches that an ideal size of roasted coffee grind for espresso coffee is between 25 to 395 microns and preferably 195 to 240 micron.

In FR2477001 to Grassi, the brewer includes a mechanical system to have the grinder to modify the average particle size of the coffee. The magnitude of such modification is based upon the discrepancy between the brewing time effectively needed to dispense one espresso coffee and a standard brewing time (fixed at thirty seconds), considered to be the ideal brewing time.

U.S. Pat. No. 4,767,632 to Meier teaches to measure the displacement path of the compression piston and the time required to dispense a preset volume of beverage, to compare these data to stored data and to use a possible difference between these parameters as means to adjust the amount of coffee and the size of milled coffee particles when brewing subsequent beverages.

U.S. Pat. No. 5,645,230 to Marogna discloses a coffee grinding and dosing apparatus provided with means to detect ambient humidity and to accordingly adjust the grinding blade distance to provide a finer or coarser particle size.

The above solutions, however, are not sufficient because several other factors may affect the correct dispensing of a coffee.

In some cases deposits of ground coffee build up on the coffee chute placed above the brewing chamber: less coffee reaches the brewing chamber until the deposits collapse to discharge a greater amount of ground coffee in the chamber. Variable quantities of coffee in the brewing chamber may also be due to lack of precise measuring devices: such is the case when the grinder is operated for a pre-set amount of time, when volumetric chambers are fed with coffees having different particle sizes, e.g. because of wear of the grinder.

EP1306040 to Mestek, EP0486434 to Torma and other documents describe a closing piston in the brewing chamber using a "compensation spring" i.e. a mechanically resilient means to alter temporarily the internal volume of the brewing chamber.

The above discussed documents do not address the problems related to the type of coffee being dispensed, the volume or size of ground coffee used, or other considerations suggested by market preferences or cost-saving. It must be considered also that the concept of coffee may be differently interpreted and a coffee machine has to be an answer to the different requirements of the end users. Moreover, in a dispensing machine using pre-filled capsules containing ground coffee, the capsules cannot undergo any further grinding of the coffee therein contained and, therefore, this parameter cannot be changed.

Therefore, there is the necessity of a brewing process and machine that can automatically compensate for the many changes of the product or the dispensing conditions in order to have a constant good coffee quality.

There is also the need of a process and a machine that carries out such compensation in real time, i.e. during the same brewing procedure.

SUMMARY OF THE INVENTION

It is an aim of the invention to solve the above problems and to provide a brewing process and apparatus that constantly maximize the quality and the extraction yield of hot beverages obtained from ground fresh ingredients filtered in a brewing chamber by correction of parameters. One further aim of this invention is to illustrate a brewing system that not only adapts to changed conditions within pre-set thresholds, but that adjusts its settings by monitoring the brewing conditions as transmitted by the brewing system's sensors during the brewing cycle.

One further aim of the present invention is to reduce the splashing of coffee usually associated to a fixed beverage outlet spout's height of beverage dispensing machine utilizing beverage containers bearing different rim heights.

Said aims are achieved by means of the present invention, that relates to a dispensing machine for hot beverages according to claim 1.

The present invention also relates to a beverage dispensing apparatus (1) for dispensing beverages from a brewing chamber (2;82) provided with means (4-7) to filter hot pressurised water through ground edible ingredients such as coffee, tea or herbal remedies, means (17,18,20) of detecting brewing parameters data when brewing said beverage, a controlling unit (16) comprising means of storing and of comparing said real-time data to a set of stored data, to determine whether a correction to the parameters should be made, and means of adjusting at least one of said relevant brewing parameters, when required to bring said real time data in line with said recorded parameter, characterized in comprising means of detecting said beverage flow rate and means to adjust a beverage brewing parameter selected from means to modify the flow rate of the water fed to said brewing chamber (2; 82) and means to modify said brewing chamber volume, when required to bring said beverage flow rate in line with said stored data.

The present invention provides a process and an apparatus to control, monitor and adjust the brewing process according to one or more parameters that can be stored in the controller's memory of the brewing system.

The invention process compares at least one of the data monitored by the same controller during the brewing step with at least one previously stored data and, as effect of such comparison, directs and controls through appropriate means the best real-time adaptation of the current brewing cycle towards ideal brewing conditions.

In other words, the present invention monitors and changes, if necessary during the same brewing process, the brewing process parameters according to a number of parameters that are set in the controller's memory of the brewing system. According to the invention, the beverage flow rate is adjusted by modifying the brewing chamber volume; to this purpose, the apparatus comprises one or two pistons independently controlled by motors, for the brewing chamber in order to modify the volume of said chamber.

According to another preferred aspect of the invention, the beverage flow rate is adjusted by controlling the flow rate of the hot water entering the brewing chamber. This is done by using more than one pump or by changing the water pump speed or by using a valve means that deviates part of the flow or limits the same. It is a further object of the invention a beverage dispensing machine having at least two vibration pumps in series connected.

In one embodiment, the invention relates to a process of controlling the brewing of beverages from a brewing apparatus (1) comprising a brewing chamber (2;82) provided with means (6,7;86,87) to filter hot pressurised water through ground edible ingredients such as coffee, tea or herbal remedies and a controlling unit (16) comprising means of storing and comparing data, characterized in comprising the following steps:
  a) detecting at least the beverage flow rate data of the beverage dispensed during said brewing step;
  b) comparing said detected data with data stored in said controlling unit memory to determine whether a correction to the actual beverage flow rate should be made and
  c) adjusting a beverage brewing parameter selected from the flow rate of the water fed to said brewing chamber (2; 82) and said brewing chamber volume, when required to bring said beverage flow rate in line with said stored data.

The process is preferably carried out in real-time, during the same brewing process.

More generally, the means of modifying the beverage flow rate are selected from at least one of: means of modifying said brewing chamber volume; means of modifying the flow rate of hot water entering the said brewing chamber; possibly also means of controlling the output of beverage from the brewing chamber. In addition, means of modifying the grinding parameter of the coffee can be used, too.

The output control means can be implemented by a valve means on the outlet duct for the beverage, said valve operation being controlled by the controller in a real-time feed-back system.

According to a further preferred aspect said aims are achieved by setting parameters for a programmed sequence of the operations required to complete the beverage brewing cycle and, monitoring both stored data and actual data obtained during the brewing step, by adjusting the flow-rate, possibly also the pressure in the brewing chamber and the average size of the particles, in order to approximate the dispensing path as defined by a range of ideal dispensing curves relating flow-rate with time, pressure and liquid volume for each stored beverage sequence.

In particular, control of the flow-rate of the beverage and of the sequence of brewing steps is carried out through the use of two motors that are independently operating one or two pistons sealing the brewing unit, at least one flow-rate detector and valve means placed in fluid connection upstream to the brewing chamber, hot water feeding means and beverage outlet means, liquid waste discharge means and a controller board connecting the different components.

By controlling and adjusting the flow rate of the hot water fed to the brewing chamber it is possible to improve the quality of coffee brewed from capsule, where compression and particle size are not adjustable.

BRIEF DESCRIPTION OF THE DRAWINGS

The invention will now be further disclosed with reference to the enclosed non-limiting drawings, where FIG. 1 is a lateral view of an apparatus according to the invention at the end of a dispensing step;

FIG. 2 is a top view of the apparatus of FIG. 1;

FIG. 3 is a sectional view of the apparatus of FIG. 1;

DESCRIPTION OF PREFERRED EMBODIMENTS

Figure 4:
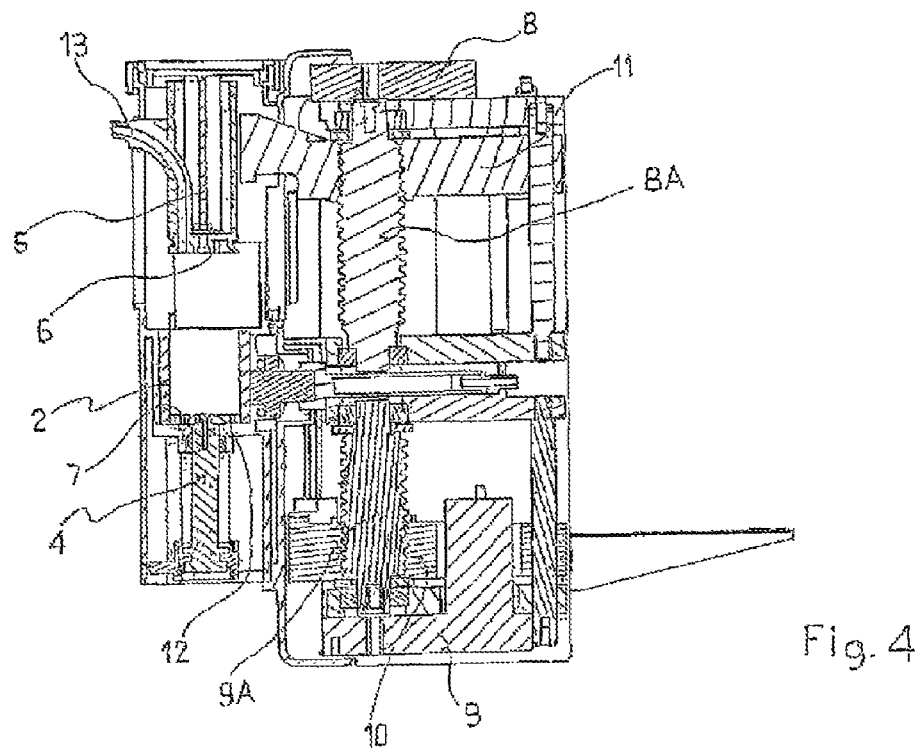
FIG. 4 is a sectional view of the apparatus with the two pistons aligned before reaching the brewing position.

With reference to FIGS. 1-6, the brewing apparatus 1 according to the present invention is comprising a preferably cylindrical brewing chamber 2, made of metal such as stainless steel or brass, or teflon coated material or plastics, with at least one side 3 that can be open for discharging the spent material from which the beverage was brewed.

Two brewing pistons 4, 5 are provided at opposed ends of the chamber 2, when in use, to hermetically seal it during the brewing step. At least one piston (5 in the shown embodiment) is displaceable from an open position in which piston 5 is outside the chamber (see FIG. 2) to a closed, brewing position. Means to control the maximum displacement of each of said pistons so that the minimum volume inside the chamber is not less than a preset value are also provided; generally, such value is 5-6 cc.

Two filters 6, 7, are mounted facing each other on the top area of each of the pistons 4 and 5. The filters are provided in a known way with a plurality of holes, preferably having regular sizes and diameters within the range of 0.15 to 1 mm and positioned to have an optimal water distribution and extraction of the coffee cake.

The pistons 4 and 5 are operated by two independent motors 9 and 8, respectively, to which the pistons are connected with means adapted to move the two pistons axially respective to the brewing chamber. The motors, preferably with direct current supply, are connected to worm screws 8A and 9A that are acting on blocks 10 and 11 to move them upwards or downwards. Blocks 10 and 11 are connected to pistons 4 and 5, respectively, so that both pistons can be moved in both forward and backward directions, independently from the other piston or other components associated to the brewing unit.

The motors 8 and 9 can independently invert the sense of their rotation, and are activated by a micro-processor-equipped electronic controlling board, which includes a power-board suitable to drive the two motors independently and monitor, by means of the impedance or other signal, the load applied against it. This parameter is used to determine the pressure opposed by the ground ingredient compressed in the brewing chamber to said pistons. Both motors can be equipped with means to detect the displacement length of the associated piston. Suitable means are e.g. an encoder, a Hall sensor, opto-switches and similar.

One of the pistons, piston 4 in the shown embodiment, is provided with a port 12 or similar means of feeding a pressurised, hot water from a source not shown to the brewing chamber 2. Beverage outlet means 13 for discharging the brewed liquid into the user's beverage container are associated to the piston 5, i.e. integral with it, and are moved with piston 5. Outlet means 13 shown in FIGS. 1-6 comprise a rigid duct to which a further, flexible, duct (not shown) is connected to deliver the brewed beverage to the cup.

Figure 8:
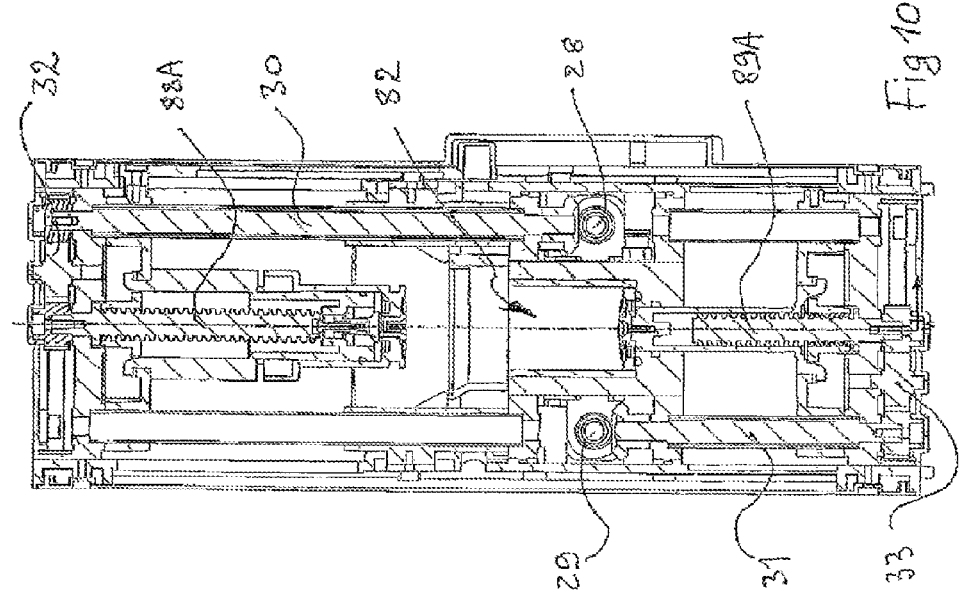
FIG. 8 is a lateral sectional view of another embodiment of the brewing group of the invention.
Figure 10:
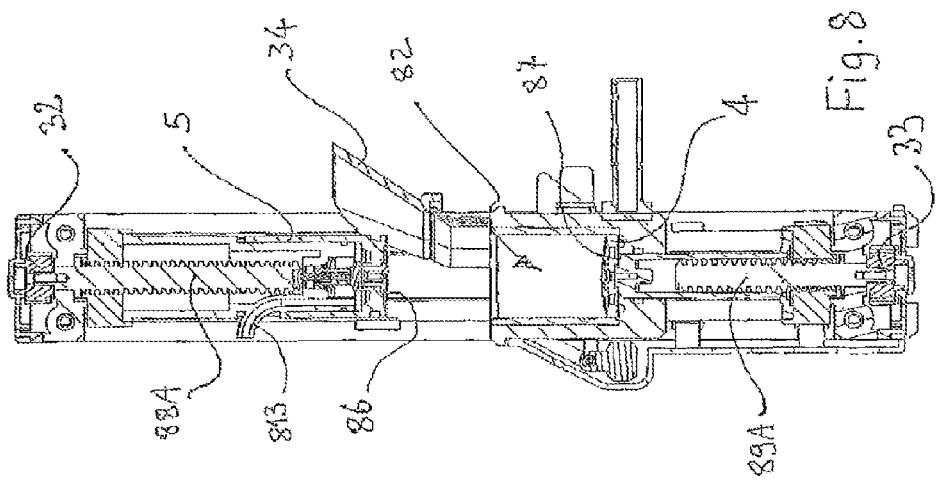
FIG. 10 is a frontal sectional view of the group of FIGS. 8 and 9.
Figure 9:
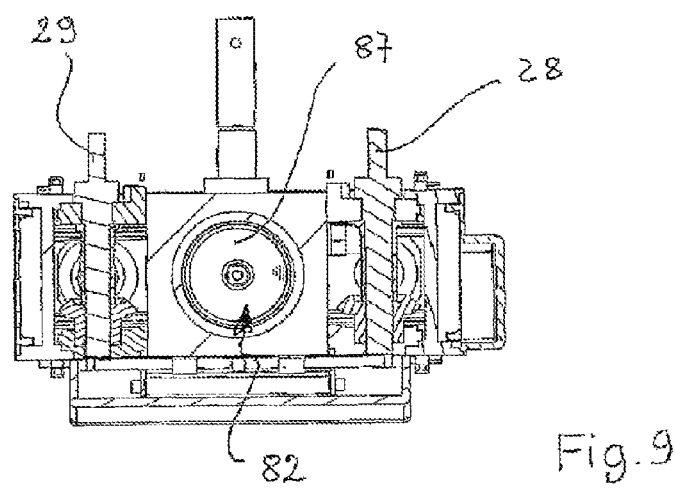
FIG. 9 is a top sectional view of the group of FIG. 8.

FIGS. 8-10 show another embodiment of the invention apparatus, wherein similar elements are referred to with the numerals used in FIGS. 1-6, with the addition of 8. In this embodiment, the two pistons 84 and 85 are coaxial with respective worm screws 89A and 88A that are each operated by an electric motor (not shown) through shafts 28 and 29 positioned at mid height of the brewing group. Shafts 28 and 29 are respectively connected to vertical shafts 30 and 31 that are operating gears 32 and 33 that are connected to worm screws 88A and 89A. Filters 86 and 87 are provided on each piston to filter the ground coffee as previously explained. In FIG. 8 a chute 34 for the ground coffee is also shown.

Figure 7:
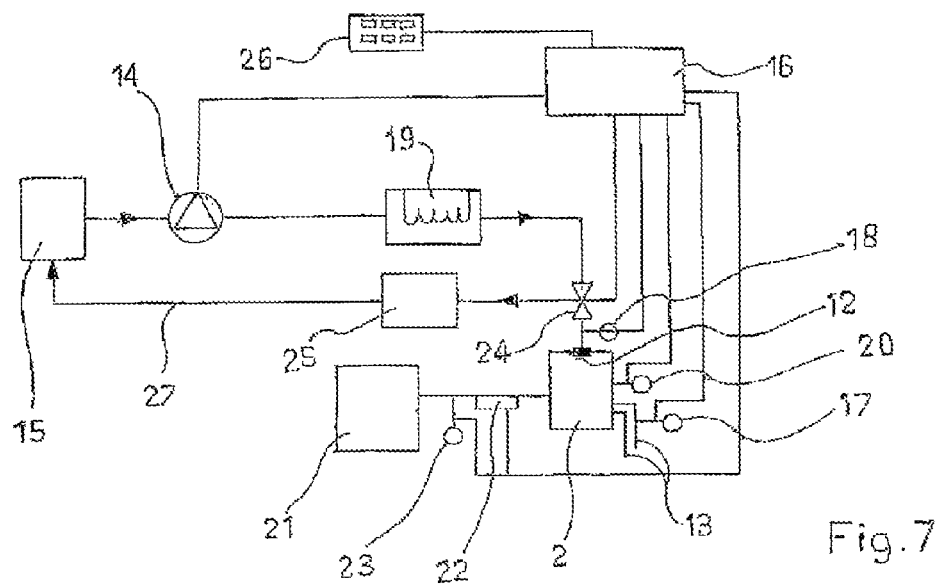
FIG. 7 is a schematic diagram of a water circuit for controlling the water flow rate.
Figure 6:
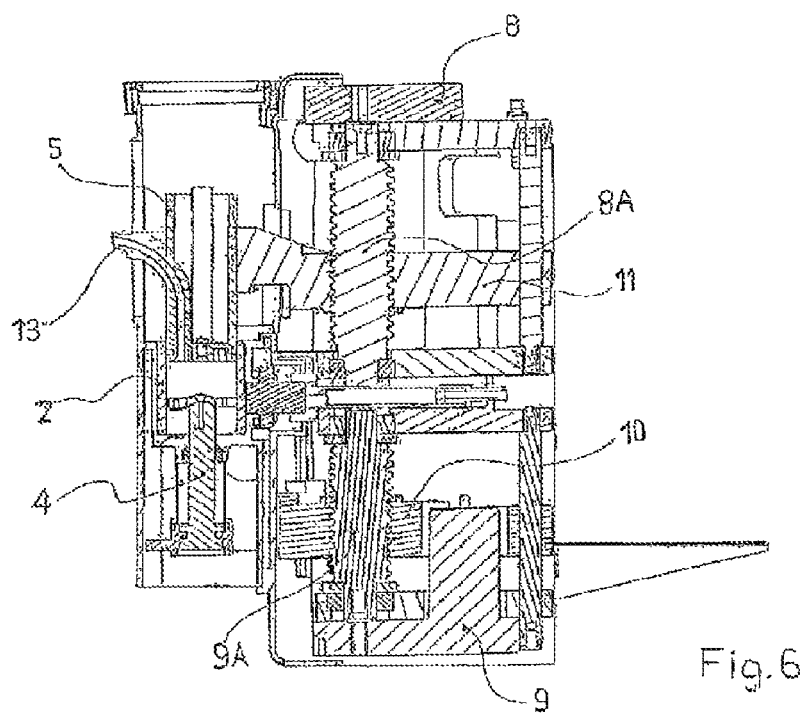
FIG. 6 is a sectional view similar to FIG. 5, where the brewing chamber is larger and in a different position.

With reference now to FIG. 7, the apparatus according to the invention comprises a pump 14, to create the required pressure for the brewing process, in fluid connection with the water inlet 12 of the brewing chamber 2 and connected to a water source such as a water reservoir 15. The preferred flow-rate is at least 0.7 to 10 cl./sec, usually 1-2 cl/sec for espresso coffee, and the pressure of the hydraulic circuit is within a range from 0.1 MPa and 2.0 MPa, and preferably within the range of 0.3 to 1.8 MPa. Pressurised water leaving pump 14 is heated at temperatures ranging from 70 to 110 degrees Celsius, preferably between 80 and 100° Celsius using a pressurised water heating device 19 such as a boiler-tank or flash-heater supplied by water reservoir 15 (or water mains). Temperature control means 20 are also provided, associated with the water conduits, brewing chamber 2 or beverage conduits; means 20 are adapted to transfer real-time information (i.e. actual data detected during the brewing of the beverage) concerning the temperature of at least one of the component amongst the heated components of the circuit other than the water heating device to a controller board 16.

The scheme of FIG. 7 also shows metering means 17 to detect the flow of the dispensed beverage or, alternatively, means 18 for detecting the flow rate of the water fed to brewing chamber 2. Both these means, as well as the other sensors means of the invention apparatus, are connected to controller board 16 via circuitry or via transponders. Preferred flow-meters have a scanning unit allowing to control differences in the flow at least as low as 0.5 ml/sec, and preferably 0.1 ml/sec; additionally a flow-meter detector, a weight sensor, a flow detector or other methods to verify the out-going flow-rate, can be placed in the beverage outlet means to monitor effective real-time output of the dispensing apparatus.

According to the invention, controller board 16 has digital memory means and means apt to transfer and download from external sources settings concerning the different phases typical of the brewing process, this controller board being logically or electrically connected to all electrically operated components comprised in the brewing system and being preferably equipped with a micro-controller having at least 28K Ram memory and a 5 Ghz clock.

Digital software is integrated in the controller board, or is provided in logic connection to board 16. The software is developed to control and direct the several means, sequencing them in proper order, aimed at controlling the different steps of the brewing cycle. The parameters of the preferred brewing sequence are stored for each individual drink available to the user in the controller's memory.

The parameters of the brewing sequence can be adjusted in a remote location, using a PC with dedicated software. New settings can then be loaded onto the controller's memory using a flash-Eprom, an electronic tag, a transponder or other system of remote transfer of electronic files. Some, preferably simpler, parameter settings may be rendered available for modification to the users of the dispensing appliance by using the means for forwarding an input command to the controller such as push buttons or keyboard or touch-screen, or through other devices such as a hand-held, wire or wire-less terminal to be used at the machine's site. Current active settings are stored in the controller's memory and can be retrieved for remote control. The controller may use any of the systems available to the skilled in the art to retrieve and re-load these data, such as GPRS, a modem connection for Internet access to a central data-bank, contact-less memories, a hand-held terminal, flash-eproms or other suitable means of transfer of the digital information. The operational software, typically included in the controller's board, allows also to pre-select different degrees of sensitivity for the adjustment process.

At least one storage container 21 for coffee beans and a grinder 22 attached to it or, alternatively, a container for fresh ground edible product such as coffee or tea, or with means adapted to provide a metered amount of coffee grounds to the brewing chamber are provided in a way known per se in the art. In addition, one or more containers for instant soluble ingredients can be provided.

The metering means to control the amount of coffee dispensed in the brewing chamber can be volumetric or time-based, using an inference table, for instance listing time of operation of the grinders and expected volumes of coffee depending on average particle size of the coffee.

In preferred embodiment of the invention the storage container 21 is provided with sensor means 23 to detect the air relative humidity and temperature in proximity of the coffee container or within it. Sensor 23 and grinder 22 are connected with board 16 to provide and receive information. The apparatus according to the invention also comprises metering means (not shown) to monitor the exact length of displacement of each piston, for instance detecting it by inference, using encoder-equipped or step-by-step motors or electro-mechanical systems, or coupling electronic sensors, using systems available to the skilled in the art such as Hall-effect sensors or others, to the respective motor shafts of the two motors controlling the brewing pistons or to parts of said pistons, in the latter case to detect even without inference the actual positions of the two, distinct pistons.

The apparatus is further provided with means for forwarding an input command recognised as valid input command by the controller, this input command being used to deliver instructions to the controller concerning the type of beverage requested by the machine's user, for example a customer or the bar-tender. The input method may include a keyboard, for instance of a numerical or alphanumerical type, a simple membrane panel using pictograms or interactive panel, such as a touch-screen LCD, or any other common physical interfaces for sending a brewing or dispensing instruction to a machine. The chosen option can be sent also via a tag or transponder directly to a tag scanner or tag reader in the proximity of the apparatus and digitally connected to the controller board. Alternatively the input commencing the brewing cycle can be provided to the controller by any signal, for instance generated by the insertion of a coin or other validation of credit, recognised as acceptable input signal by the machine controller.

The above means comprise known means to forward to the user of the apparatus information concerning the status of the machine, such as LED indicators, an LCD or plasma screen, a vacuum-fluorescent display, as well as means to forward digitally the information to a remote location, physically separated from said apparatus.

According to the invention, the preferred parameter to be controlled and possibly adjusted is the flow rate of the hot water fed to the brewing chamber 2 or of the hot beverage leaving the brewing chamber.

As mentioned, the alterations or adjustments of the brewing parameters involve the adjustments of flow rate of the hot water fed to the chamber and/or of the volume of the chamber, additionally, size (e.g. average particle size) of the ground material for brewing, pressure of the hot water, absorption rate of the motors controlling the pistons or the pressure of the outgoing beverage liquid or the diameter of the orifices creating the total free passage in the filter placed on (before) the outlet can be adjusted, too.

It is preferred to control, i.e. to change or adjust, the flow rate of the hot water, or the chamber volume rather than reducing the beverage flow rate with a valve on the beverage outlet. It is in fact easier and cleaner to change these parameters than altering directly the hot beverage flow rate: a valve means positioned downstream the brewing chamber (or solubilizing chamber) is inevitably contacted with the beverage, with possible problems of cross-contamination when dispensing different beverages types, building up of deposits, bacteria contamination and similar problems.

It was found that when the flow rate of the incoming hot water is adjusted to maintain constant the amount of coffee brewed per unit time, i.e. to maintain a dispensing time within the range of 10 to 30 seconds and preferably from 15 to 25 seconds, most of the other parameter variations can be automatically taken into considerations and corrected.

In other words, according to the invention,
the hot beverage or hot water flow rate is detected: this is the real-time data of a brewing process to be monitored;
the detected real-time flow rate data is compared with the stored data concerning hot beverage flow rate, the stored flow rate can be different for different ground edible ingredients or drink types;
if a correction has to be carried out, the flow rate of the hot beverage is corrected by altering the volume of the brewing chamber or by altering the flow rate of the hot water fed to the brewing chamber.

In a preferred embodiment of the invention there are no mechanical means to control the flow of hot beverage between the brewing chamber and the beverage delivering means, i.e. the outlet from which the beverage is delivered into a cup: any alteration of the brewing parameters is carried out in the brewing chamber or upstream the same.

In an embodiment of the invention, in order to adjust or alter the hot water inlet flow rate, the following procedure is followed.

As soon as a pressure is established in the brewing chamber and the coffee cake is progressively penetrated by water, the flow-rate indicated by the metering device, at least one of which is in fluid connection with the brewing chamber's water inlet means, is used as a feedback signal to alter brewing parameters, after a programmable delay or starting from the pump switch on.

In case of no flow-rate indication even after the programmable delay, the dispensing apparatus is set into an "out of order" condition and appropriate interface displays such information for the machine users.

Assuming a positive flow-rate reading, as monitored by at least a flow-rate indicator placed before the brewing-chamber and in fluid connection to the same, the controller compares the reading to the comparable value of the ideal dispensing curve associated with the specific beverage being dispensed.

If there is a discrepancy between the two data, in a first embodiment, at least one of the piston's displacement length is changed as a consequence of the feedback, so that the volume of brewing chamber 2 is adjusted and the flow rate is maintained as close as possible to the pre-set dispensing curve. The minimum displacement step controllable by the controller should not vary the internal volume of the chamber for volumes higher than 0.5 cc. preferably 0.3 cc.

In a second embodiment of the invention, the flow rate of water fed into the brewing chamber is changed and adjusted. This can be carried out e.g. by using a pump having variable speed, such as a rotative pump, to dispense pressurised water into the brewing chamber. A change of speed can be obtained also by changing the frequence of vibration of a vibration pump.

Alternatively, as shown in FIG. 7, when the sensor 18 provides controller 16 with the information that the flow rate of the incoming water should be reduced, valve 24 is operated to send a portion of the flow of water to a circuit including plenum chamber 25 and connected to reservoir 15, or to the pump or to a discharge means.

Figure 11:
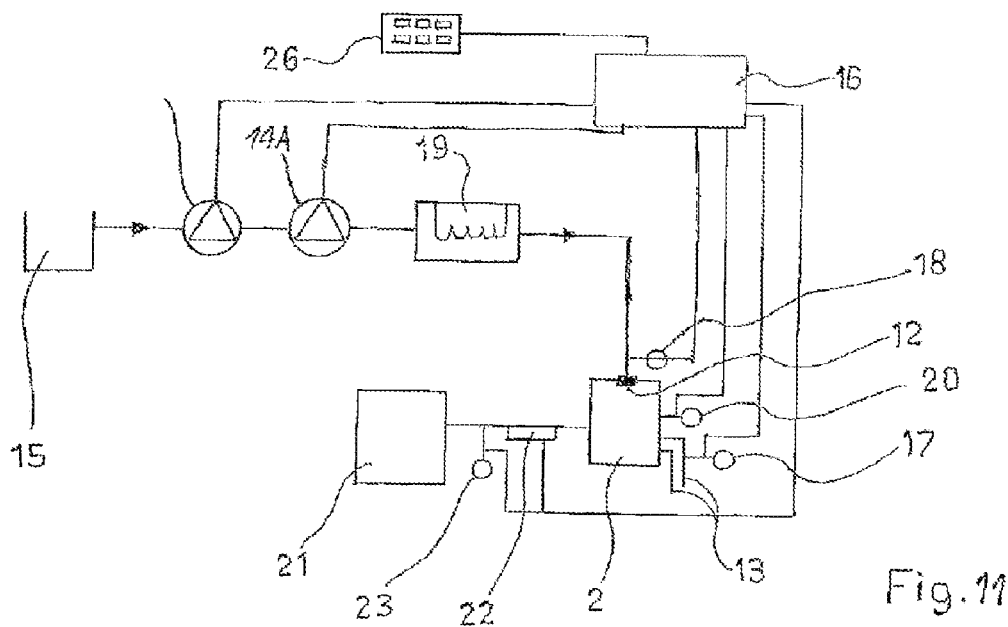
FIG. 11 is a further schematic diagram of a water circuit according to the invention.

A preferred embodiment is shown in FIG. 11, where the apparatus of the invention comprises two pumps 14 and 14A connected in series. The two pumps are preferably vibration pumps and are operated separately or at the same time according to the actual requirements of the brewing procedure. Suitable pumps are e.g. those manufactured by Ulka (Italy).

It was found that when two or more pumps are connected in series, it is possible to operate both pumps at the same time and obtain an increase of the flow rate of up to about 80% and a reduction of the dispensing time of about 45-50%. These values are obtained when two identical vibration pumps are connected in series but not if they are connected in parallel. By using two Ulka E7 vibration pumps, the flow rate increased from 2.45 ml/sec to 4.23 ml/sec and the dispensing time of an espresso (having a volume of about 47 ml) decreased from 20.4 sec to 11.2 sec. Instead of two (or more) identical pumps, two or more different pumps can be used.

The process will involve starting first one pump or both pumps, according to the requirements of the beverage to be dispensed: e.g. a filter coffee involving e.g. 150 ml will initially require the use of the two pumps to maintain the dispensing, i.e. brewing, time within the required range of 10 to 35 seconds. If the data detected during the brewing step are different from the stored data, one pump will be stopped or slowed to reach the required values.

As mentioned and below exemplified, further data may additionally be detected and further parameters may be adjusted or changed besides the flow rate. The following sequence of operative steps for the chosen beverage—for instance an "espresso" coffee—is depicting an embodiment making a full use of all the parameters and real-time data. The operating of the dispensing apparatus starts when the machine's user forwards an input command to the controller. Firstly the correct tuning of the grinding level is to be checked. Sensors 23 located near the grinder 22 or coffee container 21 detect the current value of relative humidity, and optionally also of temperature, in the air. The controller 16 includes software that allow to store data concerning historic comparable data, as monitored by said sensors at intervals of time that are programmable by the manufacturer of the apparatus.

The controller's software can use several methods to evaluate the available data, both current and historic, for instance adding each series of said stored data or parts of them, thus calculating statistically meaningful data, such as arithmetic or compounded means. A preferred compounding criteria is the time-lag between monitoring time and time of brewing, so that the readings of the last twenty-four hours, preferably of the last one to nine hours should bear more weight.

The controller's software preferably includes means to establish a trend, for example comparing current readings to the stored data readings in different intervals of time, such as for instance during the last one to twenty-four hours, conveniently stored in the memory.

Contrary to available systems, in the present invention comparison of previously recorded data to current readings is used to establish a preferred criteria to influence the adjustment of the grinder's blades, so that the user of the apparatus can opt to maintain frequent variations based on real-time data or, more traditionally, a slower pace of trimming the blades' distance, for instance for less stringent quality standards.

The motor setting the distance of the grinder blades, provided with means to detect the actual distance of the blades or alternatively to measure the length of the displacement of the motor controlling the blades, for instance from a full closed position to the actual position. When a difference from stored data higher than a pre-determined threshold is detected, the motor is actuated to adjust the blades distance accordingly. The pre-selected dose of coffee (e.g. set at 6.5 grams in the controller), having a pre-determined average particle size accordingly to the monitored relative air humidity and trend values as well as to the type of selected beverage, is dispensed in the brewing chamber 2 or 82.

After grinding the coffee beans, the brewing step is carried out.

In general, four distinct steps are provided for in the brewing cycle according to the invention and the brewing system includes sensors apt to provide to the controller board information concerning the hot beverage flow rate, the hot water flow rate, the length of the displacement of the one or two pistons and the power absorption of the motors connected to them, the temperature of means apt to transfer heat to the brewing chamber. As previously mentioned, all the sensors are connected either via hard-wiring or with transponder-type connection to the controller board 16, which is also receiving information concerning the setting of the coffee grinder's blades feeding the brewing chamber and beverage type required by the user, thereby selecting a group of pre-set parameters during that specific brewing cycle.

Figure 5:
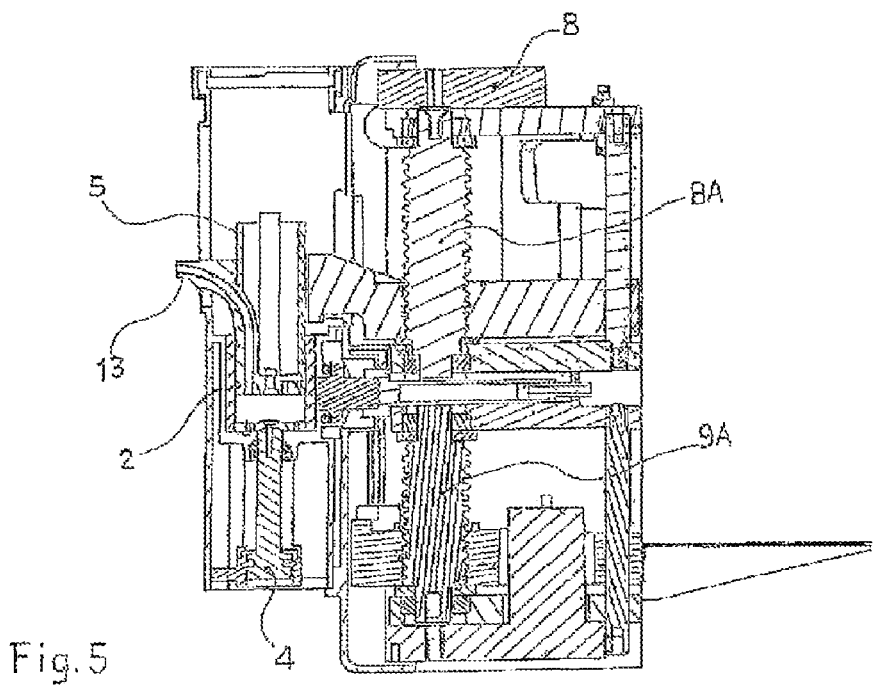
FIG. 5 is a sectional view similar to FIG. 4, with the pistons in the brewing position.

The brewing cycle starts when, the brewing chamber having been filled with the metered amount of coffee, closing piston 5 is moved from an open, filling position to a closed, brewing position (FIG. 5).

In this initial phase, at least one of the motors 8, 9 connected to the pistons reaches a pre-set, programmable absorption level set as a threshold parameter in the controller's memory, for immediate disconnection of the motor drive once the pre-set level is reached.

The set absorption level does not depend only on the amount of coffee, but for instance from programming data instructing closing the brewing piston or pistons with a predetermined amount of coffee inside the chamber. Said predetermined amount of coffee can be stored as historic data coupled with the absorption reading to establish a correlation to be used for statistical information and preventive maintenance information.

The coffee cake is now compressed from the irregular shape determined by the means used to convey it to the brewing chamber, for instance a pyramidal shape, into a cylindrical shape, with a compression level that is depending on said pre-set threshold parameter.

When the piston has reached the programmed displacement length with the compressed coffee cake, a programmable amount of water can be sprayed over the coffee cake. It is preferable to use a pump 14 with means adapted to control the flow of the pump, so that this spraying step can be performed with a reduced flow-rate, possibly at least 40% lower than the one usually used in the brewing step.

This optional step, is performed in order to pre-wet, when needed and with a programmable quantity of pressurised hot water from the water inlet means, the coffee cake, to minimise the negative effects in terms of beverage quality and extraction yield that preferential routes in the coffee cake tend to create.

After the pre-set amount of water has been dispensed over the coffee cake, the brewing unit pauses for a pre-set amount of time, less than twenty seconds, preferably between one and ten seconds.

Alternatively, the beverage outlet can be temporarily closed to create a pressure increase to obtain a similar pre-wetting step, without a pause.

The whole pre-wetting step can be omitted, especially if long coffees are to be dispensed, so to emphasize the different nature—for instance—of a so called "regular coffee" drink of 300 ml from a traditional espresso coffee, where pre-wetting is most used and higher extraction yields are usually preferred.

When beverages based on minced leaf tea, mate or herbal remedies are to be dispensed, longer throws of pre-wetting water and longer pauses before the commencement of the real brewing phase, are implemented to maximize quality of extraction.

Similarly, if soluble drinks are to be used in the chamber, pre-wetting water can be used to maximize the dissolution in the liquid of the soluble ingredient.

The second step starts when the controller activates the means associated at least to one of the two brewing pistons so that the brewing chamber is brought to a closed, air-tight, brewing position.

Motors 8 and 9, in one embodiment, are subsequently deactivated so that the two pistons are held in a pre-programmed position, depending on the type of beverage to be dispensed, expressed in terms of length of displacement or, preferably, power absorption of each of the two motors commanding the pistons.

In one embodiment, motors are adapted with means that allow said motors to remain activated during the compression of the coffee cake, until they reach a threshold level in terms of absorption, and subsequently during the proper brewing phase, so that the absorption of at least one of the motors can be used as feedback criteria.

Data concerning displacement length and power absorption, or data expressing the relation between the two, as well as their frequency, are stored in controller 16 memory for possible preventive maintenance information to be downloaded from the controller's memory.

Brewing with pressurised means is usually performed in two distinct ways: either from top to bottom of the cake, or from bottom towards the top. In the embodiment shown in the figures, the brewing is performed in the latter way, although the other method is equally usable.

Both embodiments solve one problem associated with users utilising a beverage dispensing machine with beverage containers of different shapes and—particularly—heights, such as porcelaine mugs, espresso cups, coffee cups, small jugs and similar.

Typically these containers can be adapted to fit into the dispensing area of the dispensing apparatus, but their rim heights commonly vary between 4 and 30 cm, most frequently between 6 and 20 cm.

To solve this problem a coffee outlet spout connected to the associated piston and its beverage outlet means is used, whereby the programmed displacement lengths of both pistons during the dispensing phase allow the outlet spout 13, accordingly to the pre-set beverage preparation required, to move to one of a number of pre-set positions. The outlet spout can thus be displaced right above the rims of cups having different rim heights from the bottom, such as a cappuccino cup or an espresso cup or a mug, or alternatively the outlet spout can access different outlet means adapted for instance to dispense one or two coffees at a time.

Figure 12:
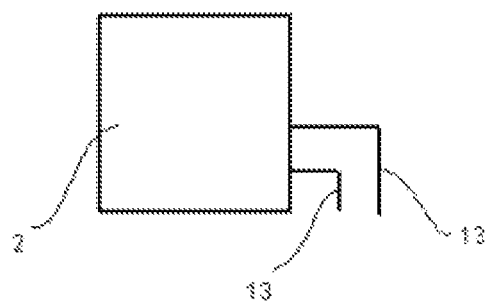
FIG. 12 is a schematic diagram of the brewing apparatus with two beverage outlet means.

The controller, depending on pre-set parameters, can execute brewing cycles for each piston having different displacement lengths in order to maintain, for the chosen type of beverage, the correct pressure of the coffee cake while minimizing the distance between container's rim and the flow of prepared beverage pouring from the outlet spout, or also to allow the outlet spout to access an alternative beverage outlet path, for instance to divert the outlet to two different dispensing outlets 13 as shown in FIG. 12.

Because the pistons can both be moved, raising or lowering the outlet spout's height, with reference to the beverage container's rim, the latter can thus be controlled independently on the amount of coffee used or to the type of coffee desired, to match the container used in the receptacle area. The height of the beverage outlet spout depends on the pre-set type of beverage or beverage container required by the user, that is following pre-set parameters in the controller's memory.

In the drawings embodiment, the brewing unit can move the beverage outlet means height in a defined range, in this case between 10 cm for single brewing cycles and 7 cm for double brewing cycles.

As soon as the pistons have completed their programmed displacement paths, hot water is fed into the brewing chamber via the filter positioned on the piston equipped with water inlet means, i.e. filter 7 or 87 of piston 4 or 84. The hot water inlet means are in fluid connection with the pump(s) 14 and 14A, possibly to one three-way valve or preferably to two separate valves to separately manage incoming hot water and residual liquid coffee waste and to the flow-rate metering device 18.

The flow rate control of this step is carried out as previously discussed, i.e. by using one or more of a plurality of vibration pumps, altering the pump speed, or altering the chamber volume. Additionally, reducing the flow rate through a valve can be carried out.

Ultimately, when the pre-set volume of water has been completely dispensed into the brewing chamber and from this to the final container, the controller initiates the sequence aimed at discharging the used coffee grounds.

Firstly, at least one of the pistons is moved, by the appropriate transmission means, from the presently final, closed, brewing position to a position defined by a displacement length longer than the one of the said final, closed, brewing position. Several displacement length are stored in the controller's memory and can be used following pre-defined matching criteria to different types of coffee beverage being dispensed or amount of liquids allowed in the waste used coffee grounds.

This compressing movement is made in order to increase the pressure existing in the brewing chamber, so that a lesser residual amount of liquid is maintained inside the coffee cake due to the higher pressure thus achieved. As soon as the displacement length value is reached, the controller opens a water conduit (not shown) to discharge the residual amount of coffee and water present in the supplying pipe, the coffee cake and brewing chamber.

This can be alternatively done with two separate valves, each of them controlling separately the water inlet to the brewing chamber and the purge conduit aimed at discharging the liquid remaining at the end of the brewing cycle inside the brewing chamber, coffee cake and water conduits, or alternatively with one three-way valve, whereby preferably the former embodiment, bearing two separate valves, allows to include separate controls to the inlet and to the outlet means so that the brewing cycle can displace in time the closing of the water inlet and the opening of the discharge means for the used, waste liquid residues.

It is useful to notice that all mentioned parameters are recorded in the controller's memory for statistical purposes and can be at any time retrieved and adjusted by means available to the skilled in the art, as mentioned.

The invention claimed is:

1. A beverage dispensing apparatus for dispensing beverages provided with means (6,7; 86,87) for filtering hot pressurized water through ground edible ingredients in a brewing chamber (2; 82), comprising two pistons (4,5) independently operated by two motors, one (5) of the two pistons being provided with a beverage outlet means (13) for dispensing the beverage from the brewing chamber (2), wherein each of the two pistons (4,5) is movable in both forward and backward directions independently from or together with the other of the two pistons (5,4) to define an attribute of said brewing chamber, the attribute being selected from the group consisting of chamber volume, chamber position and both chamber volume and chamber position; and a controlling unit (16) comprising means for storing and comparing data including one or more pre-set parameters for a brewing cycle, the pre-set parameters including the position of the outlet means and a volume of the brewing chamber during the brewing cycle, wherein a position of the outlet means provided in the piston is controlled by the controlling unit by means for adjusting length of displacement of each piston in accordance with rim height of a beverage container and maintaining at the same time the correct pressure within the brewing chamber, which is required for the brewing cycle.

2. The apparatus according to claim 1, wherein said two pistons (4,5) can move together with said beverage outlet means (13) in a height range of up to 10 cm.

3. The apparatus according to claim 1, further comprising different outlet means for dispensing one or two coffees that accessible by said beverage outlet means (13) located on one of said pistons (5).

4. The apparatus according to claim 1, wherein said pistons (4, 5) are connected to blocks (10,11) that are connected to said motors (8,9) to independently move said pistons.

5. The apparatus according to claim 1, wherein said pistons (4,5) are coaxial with worm screws that are operated by said motors through shafts (28, 29) located adjacent to said brewing chamber (82).

6. The apparatus according to claim 1, further comprising a feed-back circuit branched from the water circuit to feed water to said brewing chamber, said feed-back circuit including a valve (24), a plenum chamber (25) and a duct (27) connecting said plenum with said water circuit to modify a flow rate of hot water entering the said brewing chamber.

7. The apparatus according to claim 1, further comprising means (22) for modifying grinding parameters of the dispensed beverage.

8. The apparatus according to claim 1, further comprising means for varying at least one of the volume of the beverage chamber and a value of a flow rate of the beverage exiting said brewing chamber.

9. The apparatus according to claim 1, further comprising means for varying a height of the beverage outlet means according to dimensions of a container for the dispensed beverage.

10. The apparatus according to claim 1, further comprising a beverage container into which is dispensed the beverage, said controlling unit (16) controls displacement of said pistons (4,5) to maintain beverage flow rate data in line with said stored data or to maintain correct pressure of the ground edible ingredients in the brewing chamber while correctly locating said outlet means with respect to a rim of said beverage container or to one or two beverage outlet paths.

11. The apparatus according to claim 10, further comprising means for adjusting said brewing chamber volume by operating one of the motors associated with at least one of the two pistons (4,5) in a manner that seals said brewing chamber (2; 82).

12. The apparatus according to claim 11, wherein the two pistons are held in a pre-programmed position depending on type of beverage to be dispensed.

13. The apparatus according to claim 12, wherein said pre-programmed position is expressed in terms of length of displacement or absorption rate of each of the two motors (8,9) controlling the brewing pistons.

14. The apparatus according to claim 10, further comprising means for detecting humidity data and adjusting particle size of said ground edible ingredients.

15. The apparatus according to claim 1, wherein the ground edible ingredients in the brewing chamber are selected from the group consisting of coffee, tea and herbal remedies.

16. The apparatus according to claim 1, wherein said controlling unit (16) controls displacement of said pistons (4, 5) to maintain correct pressure of the ground edible ingredients in the brewing chamber, while correctly locating said outlet means.

17. The apparatus according to claim 12, wherein said pre-programmed position is expressed in terms of length of displacement of each of the two motors (8, 9) controlling the brewing pistons.

* * * * *